United States Patent
Rice

[11] 3,794,384
[45] Feb. 26, 1974

[54] DISK WHEEL

[75] Inventor: James E. Rice, Cuyahoga Falls, Ohio

[73] Assignee: The Goodyear Tire & Rubber Company, Akron, Ohio

[22] Filed: May 17, 1972

[21] Appl. No.: 254,022

[52] U.S. Cl.............. 301/5 R, 295/25, 301/64 SD
[51] Int. Cl..................... B60b 1/08, B60b 19/00
[58] Field of Search.. 301/5 R, 8, 63 R, 63 D, 63 C, 301/64 SD, 64 R, 65, 66, 6 WB; 74/574; 295/25, 6, 7, 26

[56] References Cited
UNITED STATES PATENTS

| | | | |
|---|---|---|---|
| 1,847,181 | 3/1932 | Harrison | 74/574 |
| 2,464,362 | 3/1949 | Wilson | 74/574 |
| 3,062,072 | 11/1962 | Hirst | 74/574 |
| 1,544,242 | 6/1925 | Lavery | 301/65 |

*Primary Examiner*—Richard J. Johnson
*Assistant Examiner*—Reinhard J. Eisenzopf
*Attorney, Agent, or Firm*—F. W. Brunner; R. P. Yaist; Frederick K. Lacher

[57] ABSTRACT

A rotatable disk wheel in which radially extending ribs are connected to the disk with the angles between a rib and adjacent ribs on either side of the rib being unequal to minimize undesirable vibrations resulting from the forces applied during rotation of the wheel.

13 Claims, 4 Drawing Figures

PATENTED FEB 26 1974 3,794,384

DISK WHEEL

This invention relates generally, ad indicated, to a disk wheel construction in which the disk is connected to radial ribs in such a manner that the vibrations due to rotation of the wheel are minimized.

Disk wheels are used in many applications where stiffness is required such as on railroads, passenger conveying vehicles and testing wheels. It has been found that when forces are applied to rotating disk wheels a vibration pattern results with one of the components in the axial direction of the wheel causing axial excitation of the wheel. This axial excitation of the wheel is undesirable in track supported vehicles because the wheels are repeatedly urged into contact with the sides of the tracks in a wheel-track interface reaction causing increased wear, a rough ride and excessive noise. The noise is further amplified by the disk wheel configuration which vibrates like a drumhead. Tests have shown that the most noisy and principal noise generators associated with transit car operation are the wheels and rails. In testing wheels for tires it is also important to control the axial excitation in order to obtain accurate and meaningful test results emanating from the tire operation which are not obscured or varied by wheel vibrations.

In the past, ribs have been added to disk wheels for reinforcing the disk and these ribs have been equally spaced around the wheel. The net effect of the addition of ribs has been to increase the intensity of the vibrations in the axial direction of the wheel.

With the foregoing in mind, it is the principal object of this invention to provide a rotatable disk wheel of simple construction to minimize undesirable vibration resulting from forces applied to the wheel during rotation thereof.

Another object is to provide a disk wheel construction with reinforcing ribs connected or fastened to the disk in which the ribs suppress axial vibration rather than increase the intensity of the vibration.

A further object is to provide a disk wheel construction with a hub connected to a cylindrical tread by a disk and radially extending ribs fastened to the hub, disk and tread at positions providing reinforcement of the wheel as well as suppression of axial vibration.

A still further object is to provide a disk wheel construction in which radial ribs are fastened to the disk by welding at spaced-apart positions for suppressing axial vibration of the wheel during rotation.

These and other objects of the present invention may be achieved by fastening the ribs to other elements of the wheel at positions which do not coincide with the equally spaced node lines of the vibration pattern produced by forces acting on the rotating disk wheel and separating the areas of axial vibration.

To the accomplishment of the foregoing and related ends, the invention, then, comprises the features hereinafter fully described and particularly pointed out in the claims, the following description and the annexed drawings setting forth in detail a certain illustrative embodiment of the invention and a modification thereof, this being indicative, however, of but some of the various ways in which the principles of the invention may be employed.

Figure 1:
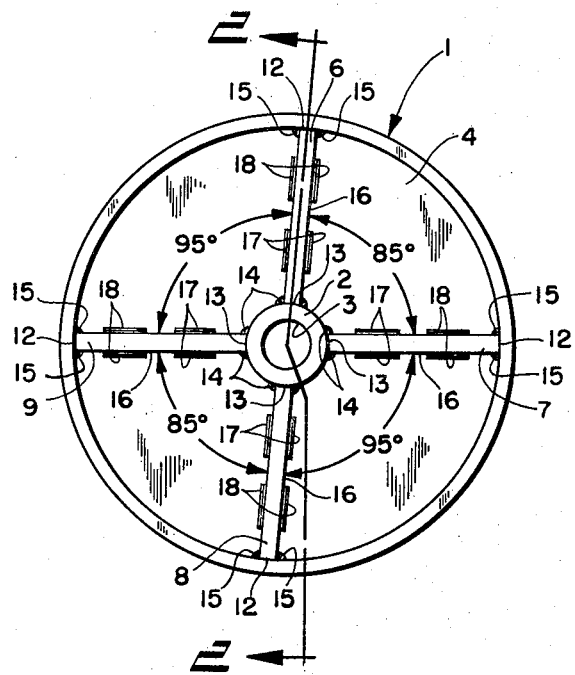
FIG. 1 is a front elevational view of a disk wheel incorporating the preferred form of the construction embodying the invention.
Figure 2:
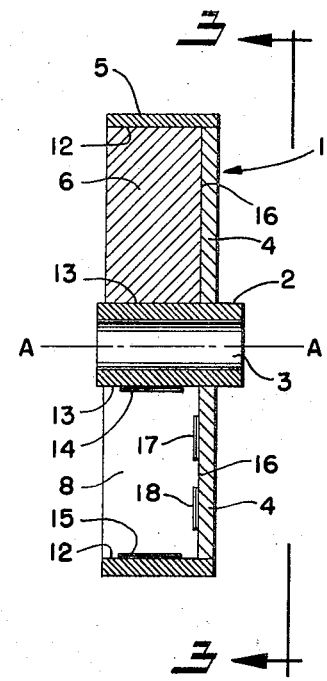
FIG. 2 is a sectional view of the wheel taken along the plane of line 2—2 of FIG. 1.
Figure 3:
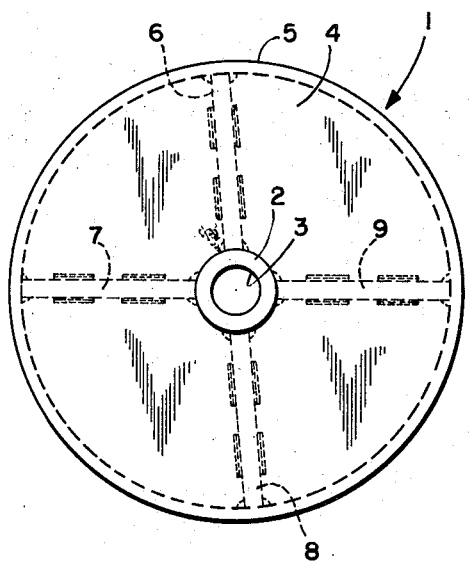
FIG. 3 is a rear elevational view of the wheel taken along the plane of line 3—3 of FIG. 2.

Referring to FIGS. 1, 2 and 3 a disk wheel 1 is shown which is of a type used for passenger carrying vehicles movable along a track where the stiffness of the disk wheel is desirable for maintaing the vehicle in a substantially predetermined position with respect to power transmitting members along the track. The wheel 1 has a central hub portion such as cylinder 2 having a bushing 3 for receiving a shaft (not shown) of the vehicle having an axis A—A about which the wheel is rotatable.

A disk 4 is fastened to the cylinder 2 and extends radially outward to a radially outer circular portion of the wheel 1 such as cylindrical tread member 5. As shown in the drawings, the disk 4 is located at the rear of the wheel 1 and the cylindrical tread member 5 extends in a forward direction with the rear edge fastened to the outer periphery of the disk 4.

Rib members such as rectangular plates 6, 7, 8 and 9 extend outwardly from the cylinder 2 to the cylindrical tread member 5 in a generally radial direction. Axially extending edges 12 and 13 of plates 6, 7, 8 and 9 are fastened to the cylinder 2 and cylindrical tread member 5 as by welding and preferably welds 14 and 15 extend only along a portion of the axially extending edges. The welds 14 and 15 may be around two-thirds of the length of the axially extending edges 12 and 13.

Radially extending edges 16 of the plates 6, 7, 8 and 9 are fastened to the disk 4 as by welding and welds 17 and 18 are located at spaced-apart positions radially of the disk. Each of the welds 17 and 18 may have a length approximately one-quarter the length of the radially extending edges 16 of the plates 6, 7, 8 and 9.

The wheel 1 may be of steel or other suitable material and the width of the plates 6, 7, 8 and 9 which is the same as the length of the axially extending edges 11 and 13 is preferably greater than the thickness of the disk 4 to provide the necessary strength and stiffness to the wheel. This same wheel construction may be obtained by other means such as a single casting with the spaced plates 6, 7, 8 and 9 and disk 4 as integral parts of the casting.

As shown in FIG. 1, the plates 6, 7, 8 and 9 are positioned with the angle between the plates 6 and 7 being 85°, the angle between plates 7 and 8 being 95°, the angle between plates 8 and 9 being 85°, and the angle between plates 9 and 6 being 95°. In this way the angles between a rib member such as plate 6 and adjacent rib members such as plates 7 and 9 on either side of the plate 6 are unequal (85° and 95°). The opposing pairs of plates 6 and 8, 7 and 9 may be in the same plane containing a diameter of the wheel 1 and extending through axis A—A as shown in FIG. 1.

Figure 4:
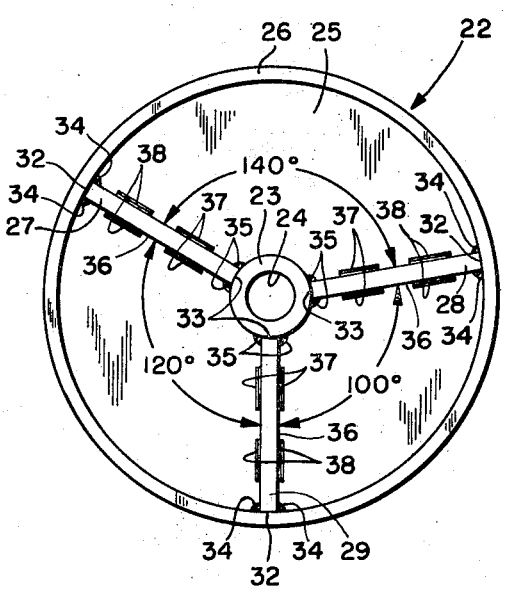
FIG. 4 is a front elevational view of a modified wheel construction embodying the invention.

A modified construction embodying the invention is shown in FIG. 4 where a disk wheel 22 has a central hub portion such as cylinder 23 containing a bushing 24 and having a disk 25 extending radially outward to a cylindrical tread member 26. Rib members such as rectangular plates 27, 28 and 29 extend radially from the cylinder 23 to the cylindrical tread member 26 and have axially extending edges 32 and 33 fastened to the cylinder and cylindrical tread member as by welds 34 and 35. Preferably the welds 34 and 35 do not extend the full length of the axially extending edges 32 and 33 and may be as long as two-thirds the length of the axially extending edges. Radially extending edges 36 of the plates 27, 28 and 29 may be fastened to the disk 25 as by spaced-apart welds 37 and 38. Preferably each of the welds 37 and 38 are approximately one-quarter the length of the radially extending edges 36 leaving unattached portions of the edges which are approximately one-half the length of the edges.

As shown in FIG. 4, the plates 27, 28 and 29 are angularly spaced apart in the circumferential direction with the angle between plates 27 and 28 being 140°, the angle between plates 28 and 29 being 100°, and the angle between plates 29 and 27 being 120°. In this way, each of the plates has angles on either side which are unequal. It is understood that the same wheel construction may be obtained by other means such as a single casting with the plates 27, 28 and 29 and disk 25 as integral parts of the casting.

In operation of the wheel 1, it is subjected to a combination of forces on the cylindrical tread member 5, the disk 4 and cylinder 2 which excite the radial, tangential and axial vibration modes. These modes effectively couple with the axial mode and tend to translate any vibration into axial excitation of the wheel 1. This axial excitation tends to cause the disk 4 to vibrate in a pattern wherein node lines extend radially of the wheel 1 at equally spaced-apart positions circumferentially of the wheel.

With the construction of this invention shown in FIGS. 1, 2 and 3, the plates 6, 7, 8 and 9 are connected to the wheel 1 at circumferentially spaced-apart positions which are not equally spaced and therefore do not coincide with the node lines which would tend to increase the axial vibration of the wheel. Instead it has been found that these plates 6, 7, 8 and 9 decrease the vibrations and suppress the axial resonances substantially. This also occurs with the three plates shown in the FIG. 4 modification. From the foregoing, it is evident that with the construction of the invention, axial vibration of a disk wheel can be suppressed and not increased by reinforcing rib members on a disk wheel.

In the preferred embodiment of FIGS. 1, 2 and 3 and the modification of FIG. 4, the disks 4 and 25 have been located at one side of the wheels 1 and 22 and the rib members 6, 7, 8, 9, 27, 28 and 29 have extended axially from the disks on one side only. In other embodiments and especially in tire test wheels, the invention has been successfully applied to wheels in which the disk is axially centered and the rib members extend axially from both sides of the disk. While certain representative embodiments and details have been shown for the purpose of illustrating the invention, it will be apparent to those skilled in the art that other changes and modifications may be made therein without departing from the spirit or scope of the invention.

I, therefore, particularly point out and claim as my invention:

1. A wheel rotatable about an axis comprising a disk member and at least three radial reinforcing and stiffening rib members connected to said disk member at circumferentially spaced-apart positions around the wheel with the angles between each of said rib members and adjacent rib members on either side of the rib member being unequal whereby the vibration pattern resulting from forces acting on the rotating wheel is modified to suppress the axial vibrations of the wheel.

2. A wheel according to claim 1 having a central hub portion, a radially outer circular portion with said disk member extending between said hub portion and said circular portion.

3. A wheel according to claim 2 wherein said radially outer circular portion is a cylindrical tread portion and said rib members are connected to said cylindrical tread portion and said hub portion.

4. A wheel according to claim 3 wherein said rib members are plates extending axially and radially of the wheel, said plates having radially extending edges connected to said disk member and axially extending edges connected to said cylindrical tread portion and said hub portion.

5. A wheel according to claim 4 wherein said disk member has a thickness less than the width of said plates.

6. A wheel according to claim 1 having three rib members and the angles between the rib members being 100°, 120° and 140° respectively.

7. A wheel according to claim 1 wherein there are four rib members.

8. A wheel according to claim 7 wherein a first pair of said rib members are positioned in a first plane containing a diameter of the wheel extending through the axis of the wheel.

9. A wheel according to claim 8 wherein a second pair of said rib members are positioned in a second plane containing a diameter of the wheel and extending through the axis of the wheel and wherein said first plane and said second plane intersect at an angle other than 90°.

10. A wheel according to claim 7 wherein the angles between the rib members are 85° and 95°.

11. A wheel according to claim 1 wherein said rib members are connected to said disk member at radially spaced-apart positions.

12. A wheel according to claim 11 wherein said rib members are connected to said disk member as by welding.

13. A wheel according to claim 1 wherein said rib members and said disk member are integral parts of a single casting.

* * * * *